Nov. 11, 1924.    1,515,162

T. E. MURRAY ET AL

SHAFT

Filed July 8, 1922

INVENTORS
THOMAS E. MURRAY.
THOMAS E. MURRAY, Jr.
BY
ATTORNEY.

Patented Nov. 11, 1924.

1,515,162

UNITED STATES PATENT OFFICE.

THOMAS E. MURRAY AND THOMAS E. MURRAY, JR., OF NEW YORK, N. Y.

SHAFT.

Application filed July 8, 1922. Serial No. 573,558.

*To all whom it may concern:*

Be it known that we, THOMAS E. MURRAY and THOMAS E. MURRAY, Jr., citizens of the United States, and residents of the city, county, and State of New York, have invented certain new and useful Improvements in Shafts, of which the following is a specification.

Crank shafts for automobile motors and similar engines are comparatively heavy and expensive. Cam shafts and other shafts having a portion or portions offset from the body of the shaft, present similar objections. Our invention provides a shaft of this class having certain advantages referred to in detail hereinafter.

Referring to the embodiment of the invention illustrated, the shaft is made of segments largely or wholly stamped up from sheet metal and welded together at their edges, the line of the weld being indicated by dotted lines in the several figures. Various methods of welding may be used; for example, ordinary arc welding or acetylene flame welding. But we prefer to use the Murray method of welding (Reissue Patent No. 15,466 of October 10, 1922) by pressing the edges together and passing through them a current of extremely high density for a very brief interval of time. This method welds the segments together simultaneously along their entire length so as to prevent warping or twisting due to heat generated during the welding operation.

Figure 1:
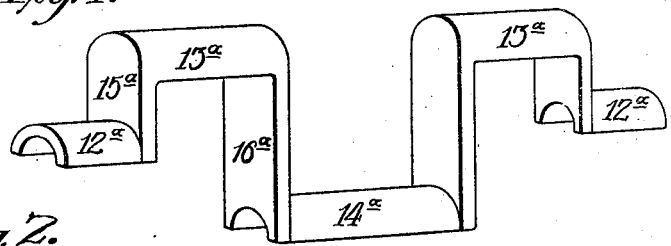
Fig. 1 is a perspective view of a segment of another style which may be used in making up a crank shaft.
Figure 2:
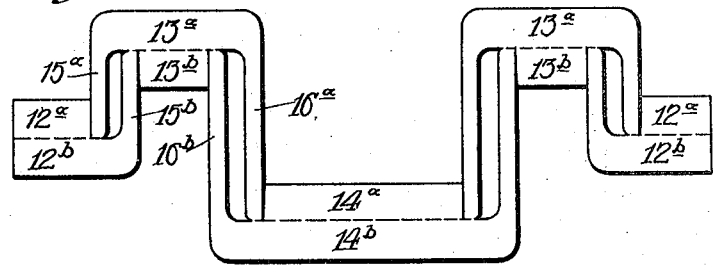
Fig. 2 is a side elevation of a shaft made up from segments of the kind shown in Fig. 1.

In making up the shaft of Fig. 2, we start with a segment of the shape shown in Fig. 1 with segments $12^a$ for the end bearings, $13^a$ for the outer crank pins and $14^a$ for the inner crank pins, these semi-cylindrical segments being connected by crank portions $15^a$ and $16^a$ which are solid flat bars, and we unite this to a complementary member having semi-cylindrical segments $12^b$, $13^b$ and $14^b$ united by crank or offset portions $15^b$ and $16^b$. The offset members $15^a$ and $15^b$ are spaced apart from each other, and so are the longer offset members $16^a$ and $16^b$. The parts are welded together along the dotted lines shown in Fig. 2. It is not essential that the segments be welded throughout the length of the shaft. In Fig. 2 they are welded only along the bearing portions. And, with respect to the constructions shown in the other figures of the drawing it is to be understood that they may be welded along only a portion or only selected portions of the lengths and are not necessarily welded along their entire longitudinal edges.

Figure 3:
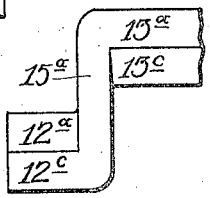
Fig. 3 is a side elevation of a portion of a shaft made up from a single segment of the style shown in Fig. 1 with certain additional pieces to complete the bearing portions.

In fact it is not essential that each of the segments of which the shaft is made be one piece extending continuously from end to end. We may, as in Fig. 3, take a blank similar to that of Fig. 1 and supplement it with short segments $12^a$, $13^c$ and so forth, serving to complete the cylindrical bearing portions; leaving only the offset connecting portions of the first blank, as $15^a$, to constitute the crank arms or other offsets.

Figure 4:
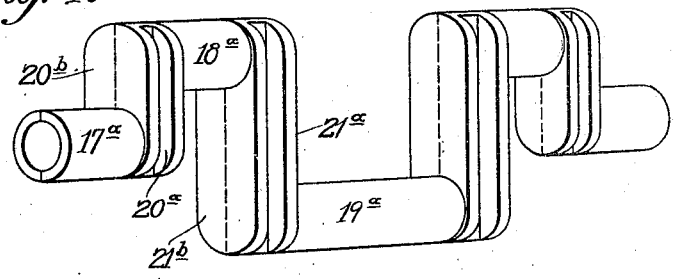
Fig. 4 is a perspective view of a crank shaft made up from segments of still another style.
Figure 5:
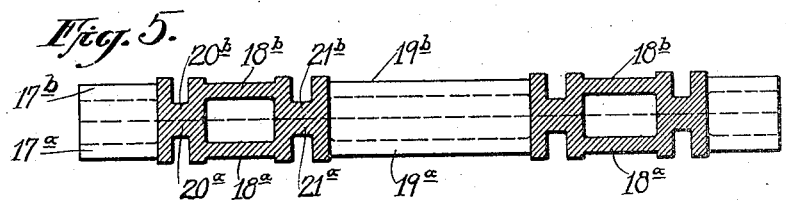
Fig. 5 is a horizontal section thereof through the bearings for the two outer crank pins.

Another convenient construction, in which the bearing portions alone are hollow, is shown in Figs. 4 and 5. This shaft is made of two segments divided along a vertical plane having semi-circular bearing portions $17^a$ and $17^b$ at the ends; $18^a$ and $18^b$ for the outer crank pins and $19^a$ and $19^b$ for the two intermediate crank pins. The offsets are, in the individual segments made in the form of channels $20^a$ and $20^b$ and $21^a$ and $21^b$. When these are united as shown they produce an offset portion of the shaft which is H-shaped in cross-section and thus has a considerable superficial exposure to the air which tends to keep it cool.

The invention is applicable not only to the making of crank shafts and cam shafts and other articles having similar shapes with offset arms, but applicable also in part at least to the making of various other articles. And when we speak of crank shafts or shafts with offset portions it is to be understood that such shafts may be made with one or more bearing portions and with one or more offset portions.

Though we have described with great particularity certain embodiments of our invention yet it is not to be understood therefrom that the invention is restricted to the particular embodiments disclosed. Various modifications can be made in the details of the shaft and the steps of the method, by those skilled in the art without departure from the invention as defined in the following claims.

What we claim is:

1. A shaft having tubular bearing portions and solid offset portions, said shaft being made of sheet metal pieces welded together, at least one of said pieces including a segment of a tubular bearing portion and a part of an offset portion of the shaft.

2. A shaft having tubular bearing portions and solid offset portions, said shaft being made of sheet metal pieces, at least one of said pieces including a segment of a tubular bearing portion and a part of an offset portion of the shaft, said pieces being united by butt-welding the edges of such segments.

3. A shaft having tubular bearing portions and non-tubular offset portions, said shaft being made of sheet metal pieces, including segments of the tubular bearing portions, said pieces being united by butt-welding the edges of said segments, and the edges of the pieces forming the offset portions of the shaft being exposed.

4. A crank shaft made of sheet metal pieces bent transversely to form segmental bearing portions and offset portions and united by butt-welding at the edges of the bearing portions alone.

5. A crank shaft made of sheet metal segments welded together, the bearing portions being circular and united by offset members having their edges and their outer and inner faces exposed to the outside air.

6. A crank shaft made of sheet metal pieces stamped to shape, one piece including an entire offset portion and a part of a bearing portion of the shaft and another comprising a second part of said bearing portion and welded to the first part.

7. A crank shaft made of sheet metal segments welded together, the joints in the bearing portions being in a plane transverse to the lengthwise direction of the offset portions.

8. A crank shaft made of sheet metal segments welded together, the joints in the end bearing portions being in a different plane from those in the crank bearing portions.

In witness whereof, we have hereunto signed our names.

THOMAS E. MURRAY.
THOMAS E. MURRAY, Jr.